United States Patent [19]
Kawamura

[11] Patent Number: 5,848,308
[45] Date of Patent: Dec. 8, 1998

[54] FINDER OPTICAL SYSTEM AND ELECTRONIC IMAGE PICKUP APPARATUS USING THE SAME

[75] Inventor: Tomoaki Kawamura, Kawasaki, Japan

[73] Assignee: Nikon Corporation, Tokyo, Japan

[21] Appl. No.: 863,067

[22] Filed: May 23, 1997

[30] Foreign Application Priority Data

Jun. 27, 1996 [JP] Japan ................................ 8-167128

[51] Int. Cl.⁶ ............................ G03B 13/08; G03B 17/20
[52] U.S. Cl. ........................ 396/374; 396/382; 396/386; 348/333; 348/341
[58] Field of Search ................................ 396/296, 374, 396/382, 386, 385, 373; 348/333, 334, 341

[56] References Cited

U.S. PATENT DOCUMENTS 4,330,797  5/1982  Yokokawa et al. .................. 348/341

FOREIGN PATENT DOCUMENTS 61-130936  6/1986  Japan .
1-101534   4/1989  Japan .
1-227134   9/1989  Japan .

*Primary Examiner*—W. B. Perkey
*Attorney, Agent, or Firm*—Shapiro and Shapiro

[57] ABSTRACT

A finder optical system includes a photographing lens, an eyepiece having an optical axis substantially collinear with an optical axis of the photographing lens, and a relay optical system, including a relay lens system, disposed between the photographing lens and the eyepiece for optically connecting a primary focal plane of the photographing lens to a secondary focal plane disposed to be observed through the eyepiece. The relay lens system has an optical axis that is parallel with the optical axes of the photographing lens and the eyepiece, and the relay optical system includes a first pair of reflecting mirrors that relay the optical axis of the photographing lens to the optical axis of the relay lens system, and a second pair of reflecting mirrors that relay the optical axis of the relay lens system to the optical axis of the eyepiece.

20 Claims, 6 Drawing Sheets

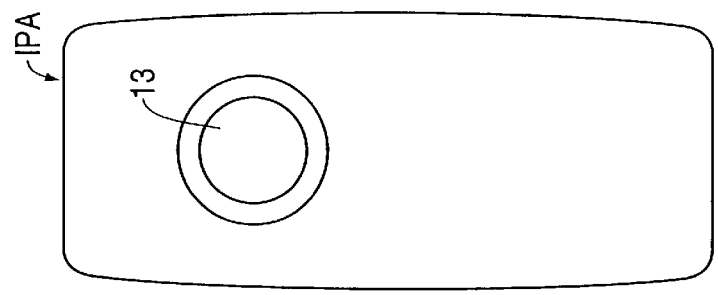
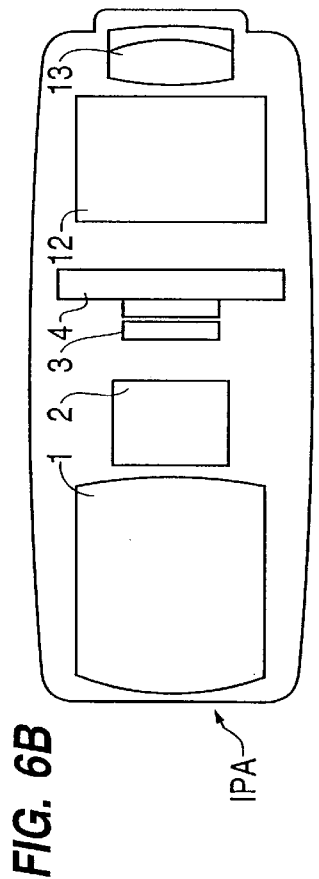
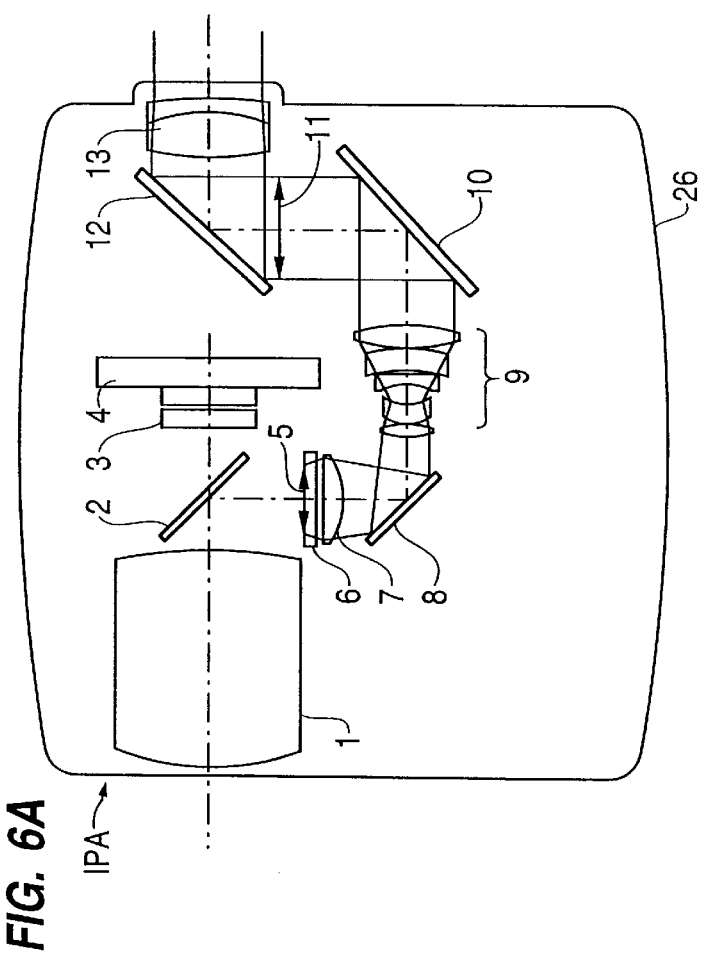
FIG. 6C
FIG. 6B
FIG. 6A

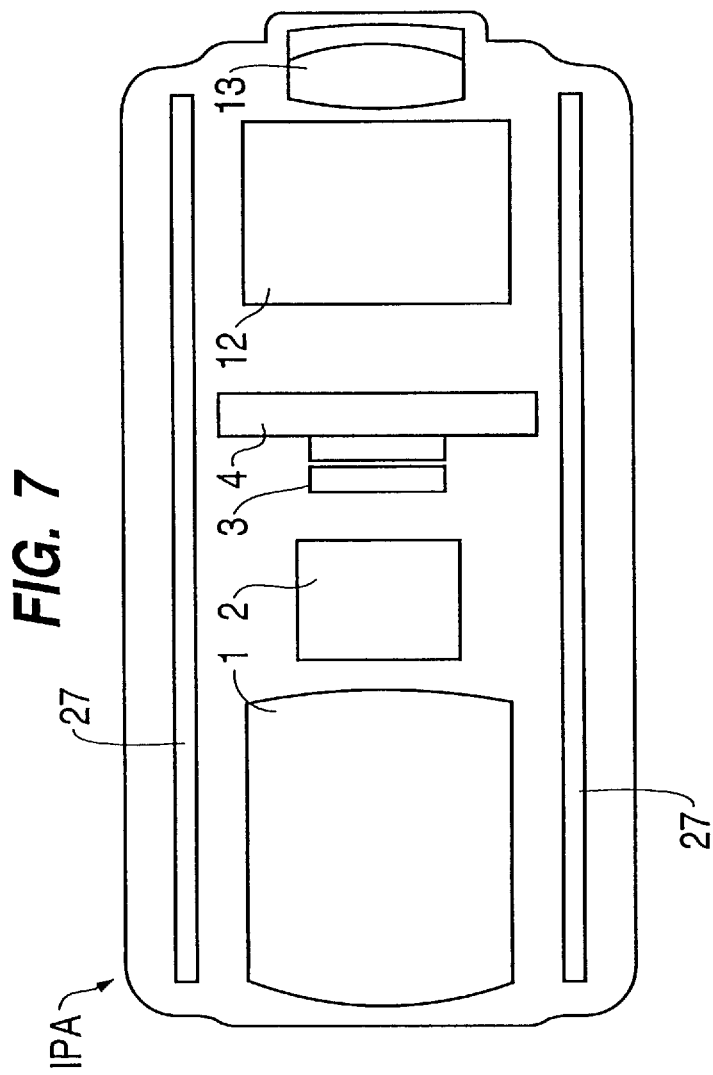

FINDER OPTICAL SYSTEM AND ELECTRONIC IMAGE PICKUP APPARATUS USING THE SAME

This application claims the priority of Japanese Patent Application No. 08-167128 filed Jun. 27, 1996, which is incorporated herein by reference.

BACKGROUND OF THE INVENTION

1. Field of the Invention

The present invention relates to a finder optical system, and in particular to a finder optical system that can be advantageously used in an electronic image pickup apparatus including electronic image pickup elements, such as photoelectric conversion elements. This invention also relates to an electronic image pickup apparatus using the finder optical system.

2. Related Background Art

In a 35-mm single-lens reflex camera, a pentaprism is generally used in a finder optical system for optically connecting a primary focal plane or image plane, in which an image is formed by a photographing lens, to a secondary focal plane which can be observed through an eyepiece. Such an arrangement is disclosed in FIG. 2 of Japanese laid-open Patent Publication (Kokai) No. 1-101534 for example.

Where the pentaprism is used in the finder optical system, however, the secondary focal plane is located in a front part of the system which is close to the photographing lens. In an electronic image pickup apparatus, such as a single-lens reflex type electronic camera in which an image pickup unit constituted by photoelectric conversion elements (e.g., CCDs) is provided for electronically capturing the image formed on the primary focal plane of the photographing lens, it is difficult to observe the secondary focal plane through the eyepiece since this focal plane is present at a position too far ahead of the eyepiece.

Japanese laid-open Patent Publications No. 61-130936 and No. 1-227134 disclose examples of finder optical systems proposed for single-lens reflex type electronic cameras. Japanese laid-open Patent Publication No. 61-130936 discloses a technology wherein a plurality of pentaprisms are used to form a finder optical path. Japanese laid-open Patent Publication No. 1-227134 discloses a technology wherein a relay lens system and a plurality of reflecting mirrors are used to form a finder optical path.

The finder optical system may also be constructed as shown in FIG. 8, by using a relay lens system and a reduced number of reflecting mirrors as compared with the finder optical system disclosed in Japanese laid-open Patent Publication No. 1-227134. As shown in FIG. 8, a photographing lens 1 is positioned to be directed toward a subject, and an image pickup unit 4 is placed at a position where the focal point of the lens 1 is located. A low-pass filter 3 is placed ahead of the image pickup unit 4 to reduce moire effects. A first reflecting mirror 2 is disposed between the photographing lens 1 and the image pickup unit 4. The reflecting mirror 2, if it is a quick return mirror, is disposed in the position as shown in FIG. 8 while the shutter is in the closed (off) position, so that a photographic light beam that has passed through the photographing lens 1 is reflected by the mirror 2, and its optical path is changed 90 degrees and directed upward as shown in FIG. 8. With the shutter being in the closed position, a primary focal plane 5, in which an image is formed by the photographing lens 1, is located on a focusing screen 6 disposed in a conjugate relationship with the light-receiving surface of the image pickup unit 4. The light imaged on the primary focal plane 5 is then guided to a relay lens system 9 through a condenser lens 7. A second reflecting mirror 8 is provided behind the relay lens system 9, for forming a secondary focal plane or image plane 11 at which the image is again formed. The secondary focal plane 11 is observed through an eyepiece 13.

In any one of the above-described technologies, however, the optical axis of the eyepiece is spaced a large distance from the optical axis of the photographing lens. Therefore, a photographer may experience an uncomfortable or disagreeable feeling when taking a picture, due to a large deviation of the position of his/her own eye from the position of the photographing lens 1 that is directed toward the subject to be photographed.

In the aforementioned arrangements using a relay lens system as shown in FIG. 8 or as disclosed in Japanese laid-open Patent Publication No. 1-227134, the height or width of the finder optical system as measured from the optical axis of the photographing lens tends to be large, which is disadvantageous in terms of reducing the size of the image pickup apparatus.

If the finder optical system is constructed without using such a relay lens system, on the other hand, it is difficult to achieve a sufficiently high magnification with a large field of view. Furthermore, although a display portion needs to be provided for displaying secondary information, such as an exposure value and a shutter speed, as well as an image of a subject, it is difficult to provide such a display portion in the finder optical system as disclosed in Japanese laid-open Patent Publication No. 1-227134.

SUMMARY OF THE INVENTION

In view of the above problems, it is an object of the present invention to provide a finder optical system which is constructed with a reduced distance of an eyepiece optical axis from an optical axis of the photographing lens, thereby to prevent a photographer from feeling uncomfortable when taking a picture, and which contributes to reduction in the size of an image capturing apparatus—for example, an image pickup apparatus.

It is also an object of the present invention to provide a finder optical system that permits an image capturing member, such as an image pickup unit, to be efficiently accommodated and positioned in an image capturing apparatus.

To accomplish the above objects, there is provided, according to a first aspect of the present invention, a finder optical system which includes: a photographing lens; an eyepiece having an optical axis that is substantially collinear with an optical axis of the photographing lens; and a relay optical system, including a relay lens system, disposed between the photographing lens and the eyepiece for optically connecting a primary focal plane in which an image is formed by the photographing lens to a secondary focal plane adapted to be observed through the eyepiece.

In one preferred form of the finder optical system according to the first aspect of the invention, the relay lens system has an optical axis that is parallel to the optical axis of the photographing lens and the optical axis of the eyepiece, and the relay optical system includes a first pair of reflecting mirrors that relay the optical axis of the photographing lens to the optical axis of the relay lens system, and a second pair of reflecting mirrors that relay the optical axis of the relay lens system to the optical axis of the eyepiece.

According to a second aspect of the present invention, there is provided a finder optical system comprising: a photographing lens; a relay lens system for optically connecting a primary focal plane, in which an optical image is formed by the photographing lens, to a secondary focal plane; an eyepiece which is disposed so that the secondary focal plane can be observed through the eyepiece; and an image capturing member which captures the optical image formed at the primary focal plane by the photographing lens, wherein the relay lens system has an optical axis that is spaced from an optical axis of the photographing lens and an optical axis of the eyepiece, and the image capturing member is disposed between the photographing lens and the eyepiece.

In one preferred form of the finder optical system according to the second aspect of the invention, the photographing lens and the eyepiece are located such that the optical axis of the eyepiece is substantially collinear with the optical axis of the photographing lens.

In another preferred form of the finder optical system according to the second aspect of the invention, the image capturing member comprises photoelectric conversion elements for converting the optical image formed at the primary focal plane by the photographing lens into an electrical signal.

In the arrangement described just above, the finder optical system may further include an image display device provided in a conjugate image plane with respect to the secondary focal plane, and a video signal reproduction device that causes the image display device to display an image corresponding to the optical image formed at the primary focal plane by the photographing lens, based on the electrical signal produced by the photoelectric conversion elements.

According to a third aspect of the present invention, there is provided an electronic image pickup apparatus including a circuit board on which an electronic circuit for controlling the image pickup unit and the image display device is mounted, and wherein the finder optical system and the circuit board are accommodated as a unit in a case, with the circuit board being disposed on a side face of the case.

The foregoing and other aspects, features, and advantages of the invention will be more fully appreciated from the description of the preferred embodiments hereinafter, taken in conjunction with the accompanying drawings.

BRIEF DESCRIPTION OF THE DRAWINGS

FIGS. 6A–6C are diagrammatic side, top, and front views, respectively, showing the arrangement of principal portions of an embodiment of an electronic image pickup apparatus in which the finder optical system of the present invention is used.

FIG. 7 is a view showing a variation based on the embodiment of FIG. 6.

DESCRIPTION OF THE PREFERRED EMBODIMENTS

Figure 1:
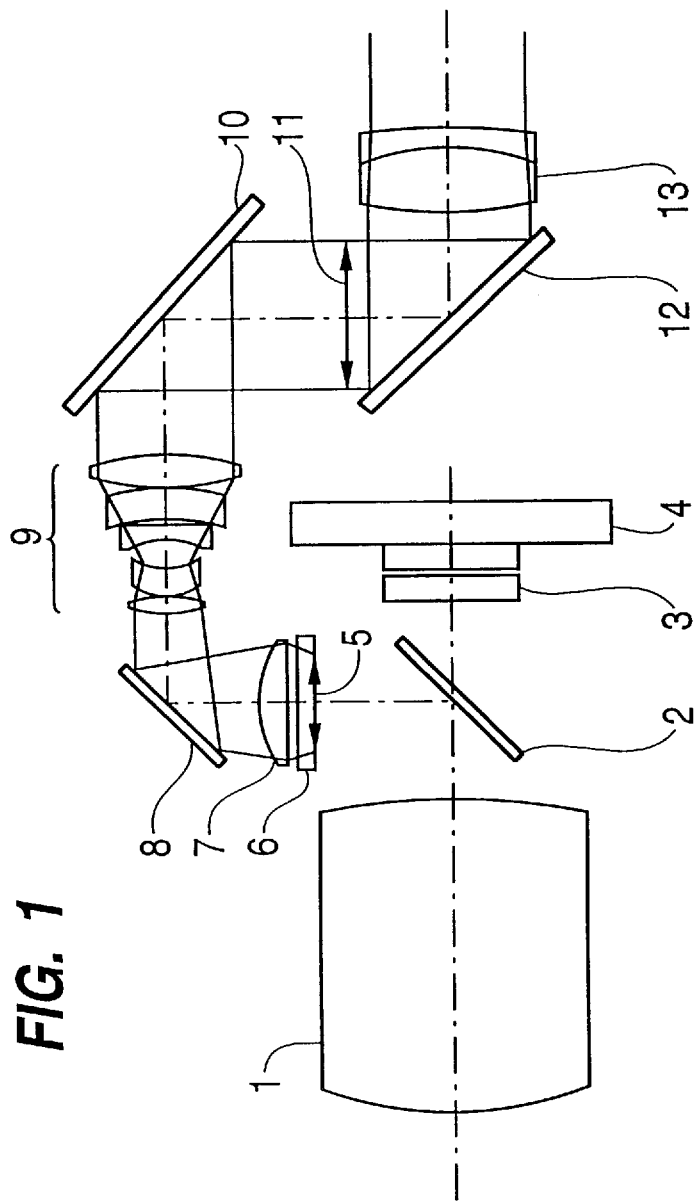
FIG. 1 is a diagrammatic view showing a first embodiment of the finder optical system of the present invention.

Some embodiments of the present invention will now be described, referring to the accompanying drawings. In the drawings, the same reference numerals and symbols are used to identify the same or similar elements.

FIG. 1 is a view showing a first embodiment of the present invention applied to an electronic image pickup apparatus—in particular, a single-lens reflex electronic camera. Reference numeral 1 denotes a photographing lens which is directed to a subject to be photographed. An image capturing member, constituted by an electronic image pickup unit 4 in this embodiment, is located at the position of a focal point of the photographing lens 1 to receive an image of the subject from the photographing lens. The electronic image pickup unit 4 includes photoelectric conversion elements, such as CCDs, which are solid-state image pickup devices, and is positioned such that its center is aligned with the optical axis of the photographing lens 1. Where the photoelectric conversion elements are in the form of CCDs, charges stored in the CCDs are read out and processed by a circuit (not shown) to produce corresponding digital signals. A low-pass filter 3 may be disposed, as needed, in front of the photoelectric conversion elements so as to reduce moire fringe or colored moire.

A first reflecting mirror 2 is disposed between the photographing lens 1 and the image pickup unit 4. Where the reflecting mirror 2 is constituted by a movable mirror (or a so-called quick return mirror), the movable mirror 2, which is a non-transparent mirror, is positioned as shown in FIG. 1 while the shutter (not shown) is in the closed (off) position. With the mirror 2 so positioned, a light beam that has passed through the photographing lens 1 is reflected by the movable mirror 2 so that its optical path is changed 90 degrees and directed upward in FIG. 1.

Accordingly, while the shutter is in the closed position, a primary focal plane 5 in which an image is formed by the photographing lens 1 is located on a focusing screen 6, which includes a ground glass member and which is positioned in a conjugate relationship with a focal plane (image plane) of the photographing lens on the image pickup unit 4. The surface of the focusing screen 6 that faces the reflecting mirror 2 is formed as a diffusion plate, such as a ground glass surface, and thus serves to determine a degree of focusing or image blur.

When the shutter is released, the reflecting mirror 2 flips up, and the image of the subject passing through the photographing lens 1 is formed on the image pickup unit 4.

The first reflecting mirror 2 may also be of a half mirror. In this case, the reflecting mirror 2 is fixed in position, and the image of the subject passing through the photographing lens 1 is guided to the image pickup unit 4 and also to the focusing screen 6.

In the finder optical system of FIG. 1, a relay lens system 9 including a plurality of lenses is disposed such that its optical axis extends in parallel with the optical axis of the photographing lens 1, and these axes are spaced a certain distance from each other.

A condenser lens 7 and a second reflecting mirror 8 are provided for relaying the primary focal plane 5 formed on the focusing screen 6 to the relay lens system 9 such that the center of the focal plane 5 coincides with the optical axis of the relay lens system 9. The condenser lens 7 serves to condense the light diffused by the focusing screen 6, and guide it to the relay lens system 9, so as to provide a bright finder image.

The second reflecting mirror 8 serves to bend the optical path backward, namely, toward the relay lens system 9. The relay lens system 9 includes a group of lenses for re-forming the primary image (the image at the primary focal plane) at a secondary focal plane, and has a function of converting an inverted image at the primary focal plane into an erect, non-inverted image at the secondary focal plane.

The relay lens system 9 also has a function of enlarging the primary image. Thus, the use of the relay lens system 9 is advantageous when the primary image is relatively small, such as when a small-sized CCD sensor is employed.

A third reflecting mirror 10 is disposed on the output side of the relay lens system 9 and functions to direct or bend the optical path toward the optical axis of the photographing lens 1, so that the image from the primary focal plane 5 transmitted by the relay lens system 9 is reformed on a secondary image forming plane 11.

A fourth reflecting mirror 12 is provided for reflecting light from the secondary focal plane 11 so that the light travels along an optical axis coincident with the optical axis of an eyepiece 13, thereby guiding the image from the secondary focal plane to the eyepiece 13. Thus, the optical axes of the photographing lens 1 and the eyepiece 13 are made collinear.

The first embodiment of FIG. 1 constructed as described above can provide a compact finder optical system including the relay lens system 9. Further, the optical path that extends from the photographing lens 1 to the eyepiece 13 is formed substantially in a U-shape.

Thus, the present finder optical system can be designed such that the image pickup unit 4 is located within a space embraced by the U-shaped optical path, assuring an excellent space efficiency. Further, the optical axis of the photographing lens 1 can be substantially aligned with the optical axis of the eyepiece 13. Therefore, when a photographer looks through the viewfinder, he or she does not feel the awkwardness associated with deviation of the optical axes as in the earlier-discussed conventional systems.

Figure 2:
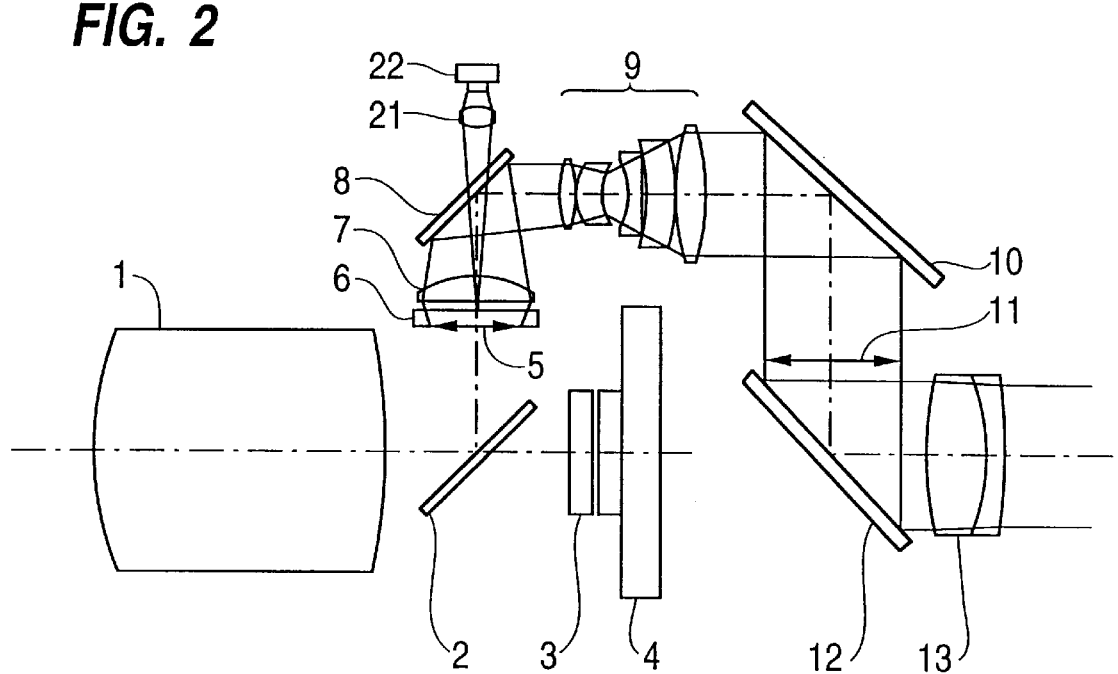
FIG. 2 is a diagrammatic view showing a second embodiment of the finder optical system of the present invention.

FIG. 2 is a view showing a second embodiment of the present invention. This embodiment is different from the first embodiment of FIG. 1 in that a part or the entire area of the second reflecting mirror 8 is formed as a semi-transparent mirror.

In this arrangement, a photometric device 22 can be disposed on the optical axis of the second reflecting mirror 8. The photometric device 22 serves to measure the brightness of the primary focal plane 5, so as to obtain information used for determining exposure parameters, such as shutter speed. Reference numeral 21 denotes a condenser lens for guiding the light transmitted through the second reflecting mirror 8 to the photometric device 22 with a high efficiency.

Thus, in the second embodiment, the light transmitted through the second reflecting mirror 8 can be measured on the optical axis of the mirror 8, without suffering from such problems as an insufficient quantity of light or a non-uniform distribution of the quantity of light, which may be caused by light displaced from the optical axis upon measurement of the finder light.

Figure 3:
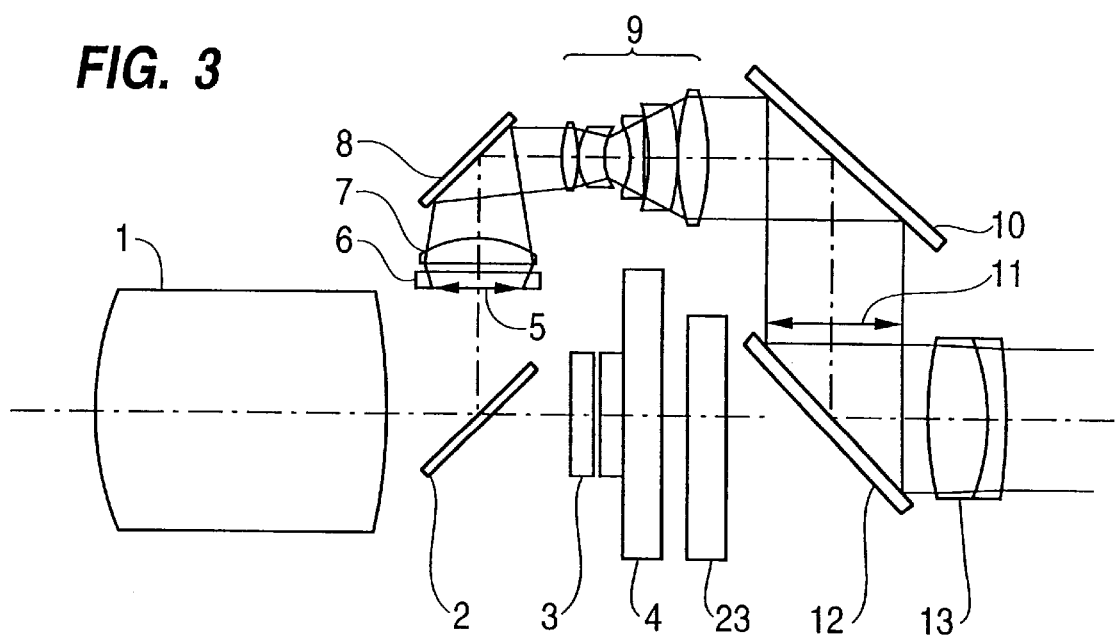
FIG. 3 is a diagrammatic view showing a third embodiment of the finder optical system of the present invention.

FIG. 3 shows the third embodiment of the present invention. In this embodiment, the fourth reflecting mirror 12 located behind the secondary focal plane is a semi-transparent mirror, and an image display device 23, such as an LCD, is provided behind the reflecting mirror 12.

In this arrangement, the photographer can switch between an optical image transmitted through the finder optical system and a display image of the image display device 23, or can observe these images superposed on each other.

Figure 4:
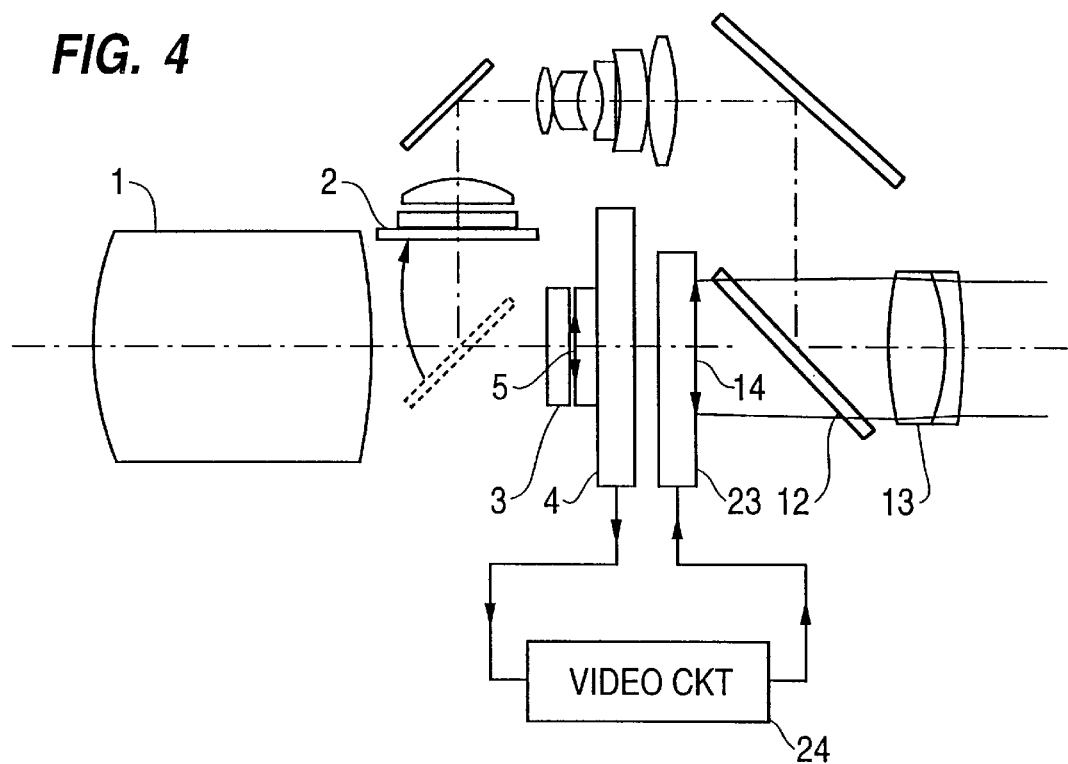
FIG. 4 is a diagrammatic view showing a fourth embodiment of the finder optical system of the present invention.

FIG. 4 shows a specific example of the case where the optical image transmitted through the finder optical system and a display image 14 of the image display device 23 are switched and displayed. The image display device 23 has a function of displaying a video signal. The finder optical system further includes a video signal reproduction circuit 24 that receives an electrical signal corresponding to the charges read from the image pickup unit 4, and converts the electrical signal into a video signal that can be displayed on the image display device 23.

Where the first reflecting mirror 2 is a movable mirror as explained above, the photographer can switch from the optical image transmitted through the finder optical system to the display image of the image display device 23 by flipping up the reflecting mirror 2 so that it escapes from the optical path to the position shown in solid lines in FIG. 4. As a result, the focusing screen 6 is covered by the reflecting mirror 2 and thus shielded from light, so that undesired light does not enter the finder optical system.

In this state, when the image pickup unit 4 is driven and its output signal is received by the video signal reproduction circuit 24, a video signal corresponding to the image formed on the image pickup unit 4 is generated by the video signal reproduction circuit 24, so that an image represented by the video signal is displayed on the image display device 23. Accordingly, the photographer can observe only the image displayed on the image display device 23.

In the example of FIG. 4, if the first reflecting mirror 2 is set in the position indicated by dashed lines and the driving of the image pickup unit 4 is stopped, the photographer can observe only the image transmitted through the finder optical system.

Thus, in the embodiment of FIGS. 3 and 4, it is possible to provide an electronic image pickup apparatus having both an optical viewfinder and an electronic viewfinder.

The image display device 23 can be used not only as an electronic viewfinder, but also as a reproducing monitor, provided it is equipped with the video signal reproduction circuit 24 and a memory as an external device for storing images.

Figure 5:
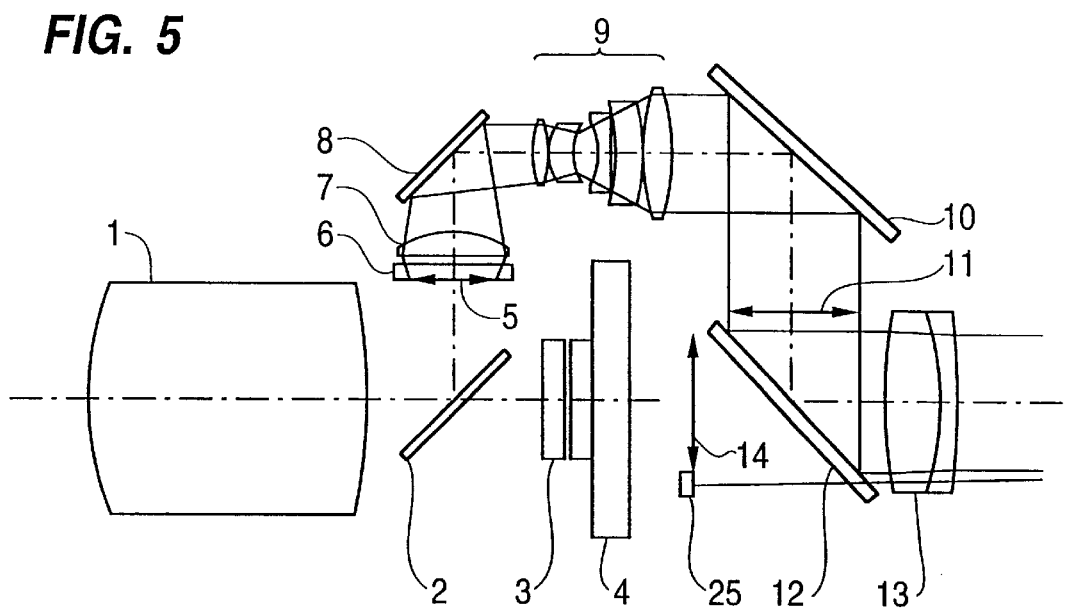
FIG. 5 is a diagrammatic view showing a fifth embodiment of the finder optical system of the present invention.
Figure 8:
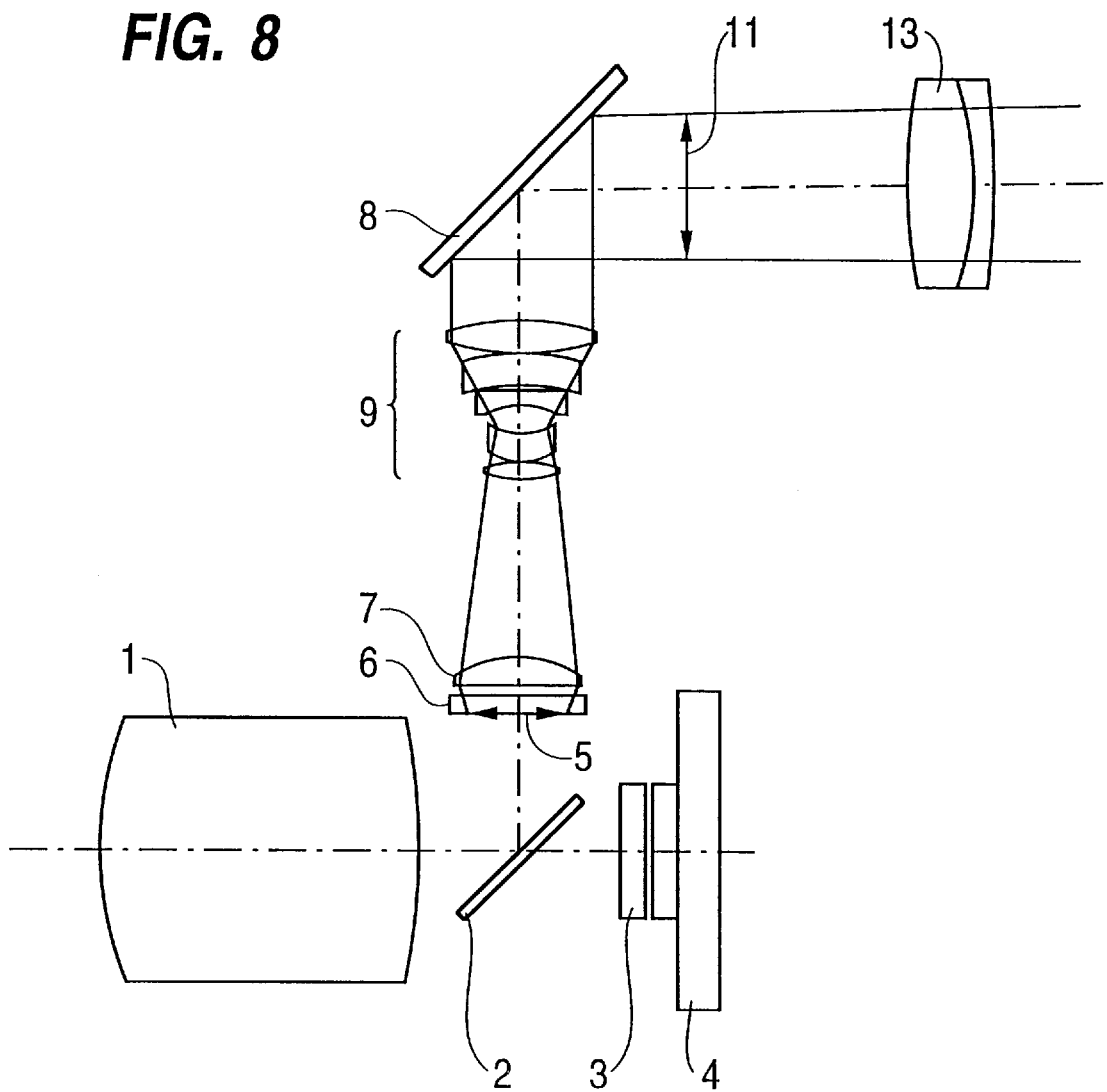
FIG. 8 is a view showing an example of a conventional finder optical system using a relay lens system.

FIG. 5 shows another embodiment of the present invention, in which part or the entire area of the fourth reflecting mirror 12 is formed as a semi-transparent mirror. Further, a display device 25 capable of displaying letters and/or symbols is disposed in a conjugate position with respect to the secondary focal plane as viewed from the eyepiece 13.

The display device 25 uses display elements, such as LEDs, for displaying thereon exposure control conditions (such as a shutter speed), the number of pictures taken or that can be taken, information on the flash unit, and/or other information. The information displayed on the display device 25 can be observed through the eyepiece 13. The display device 25 can be used in conjunction with the image display device 23, in which case the information displayed on the display device 25 can be observed together with the display image 14 displayed on the image display device 23. If the content displayed on the display device 25 is located outside of the field of the display image 14, as shown in FIG. 5, it is easier to view and recognize the displayed information.

FIGS. 6A–6C are views illustrating, in pertinent part, the construction of an electronic image pickup apparatus IPA according to the invention, in which the finder optical system of the earlier-described embodiment of FIG. 1 is used. FIGS. 6A–6C are a side view, a top plan view, and a front view, respectively, showing the arrangement of the finder optical system in a body or case 26 of the electronic image pickup apparatus. It will be appreciated, of course, that the embodiments of FIGS. 2–5 may be arranged similarly in the apparatus.

The electronic image pickup apparatus of FIG. 6 is particularly constructed such that the finder optical system as described above referring to FIG. 1 (or FIGS. 2–5) is inverted or turned upside down, and the relay lens system is positioned below the photographing lens 1. In this arrangement, the center of gravity of the apparatus can be lowered, thus allowing the photographer to take a picture in a more stable condition.

FIG. 7 shows a preferred embodiment of an electronic image pickup apparatus which takes advantage of the features of the finder optical system of the present invention. This apparatus incorporates a finder optical system as discussed in connection with FIGS. 6A–6C. FIG. 7 is a view corresponding to FIG. 6B.

The electronic image pickup apparatus IPA in FIG. 7 includes circuitry for controlling the image pickup unit 4 and, if present, the video signal reproduction device 24 and the image display device 23, as well as for controlling other electronic components (not shown). It thus requires a circuit board on which the circuit components are mounted.

In a general electronic camera, a flexible printed circuit board that fits a complicated mechanical part is suitably employed to make the camera compact. Where the flexible printed board is used, however, the procedure for assembling the camera becomes complicated.

When no pentaprism is used in the finder optical system, as in the embodiment of FIG. 7, the apparatus can be constructed such that at least its side faces, and, preferably one of its upper and lower faces provide substantially flat surfaces. Printed circuit boards may then readily be disposed on those surfaces. In the embodiment of FIG. 7, printed circuit boards 27 are disposed on both of the side faces of the apparatus and are accommodated, as a unit with the finder optical system, in the case 26. The video signal reproduction device 24 and other electronic circuit components can be mounted on these printed circuit boards 27.

As described above with reference to the illustrative embodiments, according to the present invention, a finder optical system can be provided which does not cause a photographer to experience an uncomfortable or disagreeable feeling when taking a picture. The finder optical system can be constructed with a reduced distance of the eyepiece optical axis with respect to the optical axis of the photographing lens, which contributes to reduction in the size of the image pickup apparatus. Further, the image pickup unit can be efficiently accommodated and positioned in a space embraced by the finder optical system of the present invention.

While the invention has been described in connection with preferred implementations in an electronic image pickup apparatus, it will be apparent to those of ordinary one of ordinary skill in the art in the art that such implementations are merely exemplary of the broader principles of the invention. Furthermore, it will be appreciated that the invention is not limited to application in electronic image pickup systems. For example, the invention is equally applicable to film-type cameras, such as a 35-mm single-lens reflex camera. In such applications, the image capturing member can be a film (e.g., silver salt film) disposed at the primary focal plane of the photographing lens 1 in FIG. 1, for example, instead of using the low pass filter 3 and image pickup unit 4.

The invention claimed is:

1. A finder optical system comprising:

a photographing lens;

an eyepiece having an optical axis substantially collinear with an optical axis of said photographing lens; and a relay optical system, including a relay lens system, disposed between said photographing lens and said eyepiece for optically connecting a primary focal plane of said photographing lens to a secondary focal plane disposed to be observed through said eyepiece.

2. A finder optical system according to claim 1, wherein said relay lens system has an optical axis that is substantially parallel to the optical axis of said photographing lens and the optical axis of said eyepiece, said relay optical system comprising:

a first pair of reflecting mirrors that relay the optical axis of said photographing lens to the optical axis of said relay lens system; and a second pair of reflecting mirrors that relay the optical axis of said relay lens system to the optical axis of said eyepiece.

3. A finder optical system comprising:

a photographing lens;

a relay optical system, including a relay lens system, for optically connecting a primary focal plane of said photographing lens to a secondary focal plane;

an eyepiece disposed so that said secondary focal plane can be observed through the eyepiece; and an image capturing member which captures an optical image formed at said primary focal plane by said photographing lens, wherein said relay lens system has an optical axis that is spaced from an optical axis of said photographing lens and an optical axis of said eyepiece, and said image capturing member is disposed between said photographing lens and said eyepiece.

4. A finder optical system according to claim 3, wherein said photographing lens and said eyepiece are located such that the optical axis of said eyepiece is substantially collinear with the optical axis of said photographing lens.

5. A finder optical system according to claim 4, wherein said image capturing member includes photoelectric conversion elements for converting the optical image formed at said primary focal plane by said photographing lens into an electrical signal.

6. A finder optical system according to claim 5, further comprising:

an image display device disposed in a conjugate image plane with respect to said secondary focal plane so as to be observable through said eyepiece; and a video signal reproduction device that causes said image display device to display an image corresponding to the optical image formed at said primary focal plane by said photographing lens, based on said electrical signal.

7. An electronic image pickup apparatus including a finder optical system according to claim 6, a case, and a circuit board on which electronic circuit components for controlling said image pickup unit and said image display device are mounted, said finder optical system and said circuit board being accommodated as a unit in said case, with said circuit board being disposed on a side face of said case.

8. A finder optical system according to claim 3, wherein said image capturing member includes photoelectric conversion elements for converting the optical image formed at said primary focal plane by said photographing lens into an electrical signal.

9. A finder optical system according to claim 8, further comprising:

an image display device disposed in a conjugate image plane with respect to said secondary focal plane so as to be observable through said eyepiece; and a video signal reproduction device that causes said image display device to display an image corresponding to the optical image formed at said primary focal plane by said photographing lens, based on said electrical signal.

10. An electronic image pickup apparatus including a finder optical system according to claim 9, a case, and a circuit board on which electronic circuit components for controlling said image pickup unit and said image display device are mounted, said finder optical system and said circuit board being accommodated as a unit in said case, with said circuit board being disposed on a side face of said case.

11. A finder optical system comprising:

a photographing lens;

an eyepiece having an optical axis substantially collinear with an optical axis of said photographing lens; and a relay optical system having a generally U-shaped optical path that optically connects said photographing lens and said eyepiece.

12. A finder optical system according to claim 11, further comprising:

an image capturing member disposed in a space embraced by said optical path.

13. A finder optical system according to claim 12, wherein said image capturing member is an electronic image pickup device.

14. A finder optical system according to claim 13, further comprising:

an image display device disposed so as to be observable through said eyepiece; and a video signal reproduction device that causes said image display device to display an image corresponding to an optical image formed on said image pickup device by said photographing lens, based on an electrical signal output by said image pickup device.

15. A finder optical system according to claim 12, wherein said image capturing member is photographic film.

16. A finder optical system according to claim 12, wherein said relay optical system includes a relay lens system having an optical axis substantially parallel to the optical axes of said photographing lens and said eyepiece.

17. A finder optical system according to claim 16, wherein said relay optical system includes:

a first pair of reflecting mirrors that relay the optical axis of said photographing lens to the optical axis of said relay lens system; and a second pair of reflecting mirrors that relay the optical axis of said relay lens system to the optical axis of said eyepiece.

18. A finder optical system comprising:

a photographing lens;

a relay optical system, including a relay lens system, for optically connecting a primary focal plane of said photographing lens to a secondary focal plane;

an eyepiece disposed so that said secondary focal plane can be observed through the eyepiece; and an image capturing member which captures an optical image formed at said primary focal plane by said photographing lens, wherein said relay lens system has an optical axis that is spaced from an optical axis of said photographing lens and an optical axis of said eyepiece, and said secondary focal plane is disposed between said image capturing member and said eyepiece.

19. A finder optical system comprising:

a photographing lens;

a relay optical system, including a relay lens system, for optically connecting a primary focal plane of said photographing lens to a secondary focal plane;

an eyepiece disposed so that said secondary focal plane can be observed through the eyepiece; and an image capturing member which captures an optical image formed at said primary focal plane by said photographing lens, wherein said relay lens system has an optical axis that is spaced from an optical axis of said photographing lens and an optical axis of said eyepiece, and said secondary focal plane is disposed between said relay lens system and said eyepiece.

20. A finder optical system comprising:

a photographing lens;

a relay optical system, including a relay lens system, for optically connecting a primary focal plane of said photographing lens to a secondary focal plane;

an eyepiece disposed so that said secondary focal plane can be observed through the eyepiece; and an image capturing member which captures an optical image formed at said primary focal plane by said photographing lens, wherein said relay lens system has an optical axis that is spaced from an optical axis of said photographing lens and an optical axis of said eyepiece, and said secondary focal plane is disposed between said primary focal plane and said eyepiece.

* * * * *